US012792986B2

(12) United States Patent
Veleris

(10) Patent No.: US 12,792,986 B2
(45) Date of Patent: Nov. 10, 2026

(54) ERP SECURITY MONITORING AND COMPLIANCE SYSTEM

(71) Applicant: Dimitri Veleris, Boulder, CO (US)

(72) Inventor: Dimitri Veleris, Boulder, CO (US)

( * ) Notice: Subject to any disclaimer, the term of this patent is extended or adjusted under 35 U.S.C. 154(b) by 0 days.

(21) Appl. No.: 19/379,833

(22) Filed: Nov. 5, 2025

(65) Prior Publication Data

US 2026/0127520 A1 May 7, 2026

Related U.S. Application Data

(60) Provisional application No. 63/717,229, filed on Nov. 6, 2024.

(51) Int. Cl.
*G06Q 10/0631* (2023.01)

(52) U.S. Cl.
CPC . *G06Q 10/06312* (2013.01); *G06Q 10/06314* (2013.01)

(58) Field of Classification Search
CPC .......... G06Q 10/00–50/00
USPC .......... 705/7.11–7.42
See application file for complete search history.

(56) References Cited

U.S. PATENT DOCUMENTS

| | | | | |
|---|---|---|---|---|
| 7,149,698 | B2 * | 12/2006 | Guheen | G06Q 99/00 705/319 |
| 7,940,899 | B2 | 5/2011 | Moorman, III et al. | |
| 7,941,336 | B1 * | 5/2011 | Robin-Jan | G06Q 10/06311 705/7.13 |
| 8,024,360 | B2 | 9/2011 | Moore | |
| 8,108,852 | B2 | 1/2012 | Petig et al. | |
| 10,298,608 | B2 * | 5/2019 | Knapp | G06F 21/577 |
| 10,915,641 | B2 | 2/2021 | Smith et al. | |
| 11,115,421 | B2 | 9/2021 | Nevatia et al. | |
| 11,216,531 | B2 | 1/2022 | Clarke et al. | |
| 11,443,102 | B1 | 9/2022 | Wilson et al. | |
| 11,470,068 | B2 | 10/2022 | Vasireddy et al. | |
| 11,553,036 | B2 | 1/2023 | Dojka et al. | |
| 11,995,214 | B2 | 5/2024 | Mosconi et al. | |
| 2005/0197952 | A1 | 9/2005 | Shea et al. | |

(Continued)

OTHER PUBLICATIONS

Kainos Smart Audit, https://marketplace.workday.com/en-US/apps/448029/kainos-smart-audit/overview, accessed Jun. 3, 2026, 2 pages.

(Continued)

*Primary Examiner* — Alan S Miller
(74) *Attorney, Agent, or Firm* — Whiteford, Taylor & Preston LLP; Jeffrey Schell

(57) ABSTRACT

The invention is a comprehensive security monitoring and compliance tool for Enterprise Resource Planning (ERP) systems, specifically designed for Workday. It features continuous active monitoring, periodic assessments, multi-environment support, and sensitive access monitoring. The system integrates with Workday through custom reports and REST APIs, providing out-of-the-box compliance controls for SOC1, SOC2, and GDPR. It offers customizable reporting and risk mitigation tracking. The tool addresses critical security needs in ERP environments by combining advanced analytics, continuous monitoring, and structured audit processes to maintain a robust security posture throughout the ERP lifecycle.

20 Claims, 7 Drawing Sheets

(56) References Cited

U.S. PATENT DOCUMENTS

2006/0143034 A1* 6/2006 Rothermel ............. G06Q 10/10 705/301
2006/0206895 A1 9/2006 Gray et al.
2008/0148346 A1* 6/2008 Gill ......................... H04L 63/20 726/1
2008/0183744 A1* 7/2008 Adendorff .............. G06Q 10/10 707/999.102
2009/0310764 A1* 12/2009 Gerhart ................. G06F 16/245 379/142.04
2010/0082377 A1* 4/2010 Hada ................ G06Q 10/06311 705/7.13
2011/0314148 A1* 12/2011 Petersen ............. H04L 63/1408 709/224
2012/0216243 A1* 8/2012 Gill ......................... G06F 21/55 726/1
2012/0233689 A1* 9/2012 Korablev ............ G06F 21/6218 726/17
2012/0253872 A1 10/2012 Peters et al.
2015/0039757 A1* 2/2015 Petersen ............. H04L 63/0227 709/224
2015/0356477 A1 12/2015 Milkman et al.
2016/0212100 A1* 7/2016 Banerjee ................. H04L 63/08
2016/0234239 A1* 8/2016 Knapp .................. G06F 21/577
2018/0041534 A1 2/2018 Peters
2018/0375892 A1* 12/2018 Ganor ................ G06Q 10/0635
2019/0073293 A1* 3/2019 Sharma ................... G06F 16/22
2019/0172073 A1* 6/2019 Wiig .................... G06Q 30/018
2019/0370468 A1* 12/2019 Soby ....................... G06F 21/57
2020/0175172 A1* 6/2020 Parsons ................. G06F 21/577
2021/0049227 A1 2/2021 Clarke et al.
2021/0409441 A1* 12/2021 Singh .................. H04L 63/1433
2022/0043668 A1 2/2022 Alibhai et al.
2022/0067662 A1 3/2022 Marinovic
2022/0156698 A1 5/2022 Dua et al.
2022/0374405 A1 11/2022 Morrill et al.
2022/0374914 A1 11/2022 Morrill et al.
2023/0004590 A1 1/2023 Li et al.
2023/0004604 A1 1/2023 Li et al.
2023/0004845 A1 1/2023 Li et al.
2023/0004888 A1 1/2023 Li et al.
2023/0005075 A1 1/2023 Li et al.
2023/0075067 A1* 3/2023 Iyengar .................. G06V 20/46
2023/0107316 A1* 4/2023 Ripa ...................... G06V 30/10 700/29
2023/0236855 A1* 7/2023 Oancea ................... G06F 9/451 715/740
2024/0037158 A1* 2/2024 Yang ................... G06F 16/9574
2024/0137355 A1 4/2024 McNeely et al.
2025/0377821 A1* 12/2025 G .......................... G06F 3/0652

OTHER PUBLICATIONS

Workday SoD/SA Assessment Solution | PwC Canada, https://www.pwccom/ca/en/services/alliances/workday/sodsaassessment.html, accessed Jun. 3, 2026, 2 pages.
KPMG Separation of Duties | Workday Marketplace, https://marketplace.workday.com/en-US/apps/598300/kpmg-separation-of-duties/overview, accessed Jun. 3, 2026, 2 pages.
Accenture's Internal Controls and Segregations of Duties Toolkit | Workday Marketplace, accessed Jun. 3, 2026, https://marketplace.workday.com/en-US/apps/426465/accentures-internal-controls-and-segregations-of-duties-toolkit/overview, 2 pages.
Change Tracking for Workday—Fastpath, https://learning.gofastpath.com/change-tracking-for-workday, accessed Jun. 3, 2026, 1 page.

* cited by examiner

ERP SECURITY MONITORING AND COMPLIANCE SYSTEM

CROSS REFERENCE TO RELATED APPLICATIONS

This application claims the benefit of and priority to U.S. Provisional Ser. No. 63/717,229, filed Nov. 6, 2024, entitled "ERP Security Monitoring and Compliance System," which is hereby incorporated by reference in its entirety.

FIELD OF THE INVENTION

The present invention relates generally to security monitoring and compliance management systems for Enterprise Resource Planning (ERP) software environments. More particularly, the invention relates to automated security monitoring, risk assessment, and compliance tools specifically designed for cloud-based ERP systems such as Workday, including systems and methods for continuous active monitoring of user access controls, segregation of duties analysis, configuration change tracking, and periodic security assessments within multi-environment ERP deployments.

BACKGROUND OF THE INVENTION

Enterprise Resource Planning (ERP) systems serve as the backbone of modern business operations, integrating critical functions including financial management, human resources, supply chain operations, and customer relationship management into unified platforms. Cloud-based ERP systems, such as Workday, Oracle Cloud ERP, SAP S/4HANA Cloud, and Microsoft Dynamics 365, have gained widespread adoption due to their scalability, accessibility, and reduced infrastructure requirements. These systems process and store vast amounts of sensitive business data, including financial records, employee personal information, customer data, and proprietary business processes, making them attractive targets for both external cyber threats and internal misuse.

The security and compliance requirements for ERP systems have become increasingly complex as organizations face expanding regulatory obligations. Compliance frameworks such as SOC1 (Service Organization Control 1), SOC2 (Service Organization Control 2), and GDPR (General Data Protection Regulation) impose specific controls on how organizations manage access to sensitive data, monitor user activities, and ensure segregation of duties. Traditional compliance approaches relied heavily on periodic manual audits, typically conducted quarterly or annually, which created significant gaps in visibility between audit cycles. During these gaps, security vulnerabilities, unauthorized access, and control violations could persist undetected for extended periods, potentially resulting in data breaches, financial fraud, or regulatory violations.

Security monitoring in ERP environments presents unique challenges that distinguish it from general IT security monitoring. ERP systems contain complex permission structures with thousands of potential user roles, each comprising multiple granular permissions that control access to specific business functions and data sets. Users often require access to multiple functions to perform their job responsibilities, creating intricate permission combinations that must be carefully managed to prevent segregation of duties (SOD) conflicts. An SOD conflict occurs when a single user possesses incompatible permissions that, when combined, enable fraudulent activities without requiring collusion with other users. For example, a user with both the ability to create vendor records and approve vendor payments could potentially create fraudulent vendors and authorize payments to those vendors without detection.

Existing solutions in the market have attempted to address these issues but have fallen short in several key areas. There is a lack of comprehensive, continuous monitoring capabilities that can adapt to the complex, multi-environment, and highly configurable nature of modern ERP deployments. Insufficient integration of machine learning and artificial intelligence for detecting anomalous behavior and potential security threats has also been a limitation. Moreover, there is an absence of tools that can effectively manage and track periodic security assessments which often require manual review and are crucial for maintaining ongoing compliance and risk management. Current solutions often have limited ability to provide context-aware security analysis, particularly in distinguishing between sensitive and privileged access within the ERP system. They also lack adequate mechanisms for tracking and managing the complex interplay between various security configurations, such as business process definitions, custom workflows, changes made to custom entry and exit criteria of said business process definitions & custom workflows, and integration systems.

Current ERP security monitoring solutions suffer from several significant limitations. Many organizations rely on periodic manual reviews conducted by internal audit teams or external auditors, who extract user access reports at specific points in time and manually analyze them for potential conflicts. This approach is labor-intensive, error-prone, and provides only snapshot visibility rather than continuous monitoring. When issues are identified during these periodic reviews, remediation often requires coordination between business process owners, IT security teams, and human resources, resulting in remediation timelines that typically span 12 to 18 months from initial identification to complete resolution. During this extended remediation period, the security vulnerabilities remain exploitable.

Some automated ERP security monitoring tools exist in the current market, but these solutions typically focus narrowly on specific control categories, such as SOD analysis or sensitive access monitoring, without providing comprehensive coverage across multiple control types. Additionally, existing solutions generally lack integration between continuous monitoring capabilities and periodic assessment activities, requiring organizations to maintain separate systems and manually correlate results. Most significantly, current solutions fail to account for the dynamic nature of ERP configurations. ERP systems undergo frequent configuration changes as organizations modify business processes, implement new functionality, or reorganize operational structures. When business process definitions change, previously remediated security issues may be reintroduced without triggering alerts in existing monitoring systems. For example, if an organization modifies a business process definition to add new approval steps, and this modification inadvertently grants additional permissions to users who previously had their SOD conflicts remediated, existing monitoring tools will not detect that the previously resolved conflict has been reintroduced.

The lack of machine learning and artificial intelligence integration in current ERP security monitoring solutions represents another significant gap. While ERP systems generate extensive audit logs documenting user activities, current monitoring tools primarily rely on rule-based analysis that can only detect known patterns of control violations.

These tools cannot identify anomalous behavior patterns that may indicate insider threats, compromised credentials, or sophisticated fraud schemes that do not violate explicit access control rules but nonetheless represent suspicious activities based on historical user behavior patterns.

Organizations operating multi-environment ERP deployments, which typically include separate production and non-production instances for testing, development, and training purposes, face additional monitoring challenges. Current solutions often require separate monitoring configurations for each environment, creating administrative overhead and inconsistent control coverage across environments. Non-production environments frequently contain copies of production data and may have less stringent access controls, creating potential security vulnerabilities if not monitored with the same rigor as production environments.

Prior art in ERP security monitoring includes various approaches to access control management and compliance monitoring. Some prior art describes systems for automating business processes within ERP environments but does not address continuous security monitoring or automatic issue reopening based on configuration changes. Other prior art discloses methods for assessing security risks associated with user access but does not describe continuous monitoring with automatic issue reopening capabilities or integration between continuous monitoring and periodic assessments. Neither reference addresses the specific technical challenges of monitoring dynamic ERP configurations and automatically detecting when configuration changes reintroduce previously remediated security issues.

There exists a need for a comprehensive ERP security monitoring and compliance system that provides continuous active monitoring across multiple control categories, integrates continuous monitoring with periodic assessment activities, automatically detects when configuration changes reintroduce previously remediated security issues, supports multi-environment monitoring with environment-specific configurations, and incorporates machine learning capabilities to identify anomalous behavior patterns. Such a system would significantly reduce the time between issue identification and detection, enable proactive rather than reactive security management, and provide unified compliance reporting across multiple regulatory frameworks.

While some existing patents have addressed aspects of these challenges by focusing on machine learning for access rights management in cloud applications, or with an approach to dynamic risk assessment and automated authentication, these solutions are not specifically tailored to the unique security requirements of ERP systems like Workday.

Furthermore, current solutions often lack the ability to provide a holistic view of an organization's security posture across multiple ERP environments, including production and non-production instances. This gap leaves organizations vulnerable to potential security breaches and compliance issues.

It therefore remains desirable to address these shortcomings by providing a comprehensive, ERP-specific security monitoring and compliance tool. By combining continuous active monitoring, periodic assessment capabilities, and advanced analytics, a tool remains desirable to empower organizations to maintain a robust security posture throughout the lifecycle of their ERP implementation and beyond. It remains desirable for such a tool to comprise aspects such as Continuous Active Monitoring (CAM), which scans the Workday environment every 24 hours to identify and report any control conflicts, and a Periodic Assessment Tool (PAT) that serves as a centralized repository to track and execute periodic audit activities. These aspects, along with the ability to monitor multiple Workday environments, would be desirable to provide a holistic approach to security management that is currently lacking in the context of other attempts.

SUMMARY OF THE INVENTION

The preferred embodiment of the invention is a comprehensive security monitoring and compliance tool specifically designed for Enterprise Resource Planning (ERP) systems, such as Workday. This embodiment addresses the critical need for robust security measures in ERP environments by offering a suite of features that work in concert to provide continuous monitoring, periodic assessments, and advanced analytics.

At the core of the preferred embodiment is the Continuous Active Monitoring (CAM) feature, which performs daily scans of the Workday environment to identify and report any control conflicts within predefined Control Categories. These categories encompass System Access Changes, User Access Changes, Segregation of Duties, Proxy Activity Monitoring, and Configuration Changes. The CAM feature allows for customizable scanning across different Workday environments, such as Production and Testing, enabling organizations to tailor their security monitoring to their specific needs.

Complementing the CAM feature is the Periodic Assessment Tool (PAT), a unique offering in the Workday ERP ecosystem. PAT serves as a centralized repository for tracking and executing periodic audit activities, allowing organizations to maintain ongoing compliance and risk management. This feature offers customizable review activities, flexible scheduling, and the ability to link PAT controls directly to CAM controls, providing a comprehensive approach to security management.

The invention in an embodiment includes multi-environment support, allowing connection to and monitoring of multiple Workday environments simultaneously. This capability is particularly valuable for organizations managing multiple environments with varying security requirements.

Sensitive and Privileged Access Monitoring capabilities enable organizations to define and monitor access to critical data and functions within their Workday environment. The system allows users to define Domains or Business Processes as Sensitive or Privileged, enabling more targeted monitoring and analysis.

The invention in an embodiment integrates seamlessly with Workday through custom reports built within the ERP system and data extraction via standard REST APIs. This integration allows for efficient data collection and analysis without compromising the integrity of the Workday environment.

To support compliance efforts, the system provides out-of-the-box controls that align with SOC1, SOC2, and GDPR requirements. This feature significantly reduces the burden on organizations to manually map their security controls to various compliance frameworks.

The invention in an embodiment includes customizable reporting capabilities, allowing users to generate reports on issues, controls, and audit activities. Additionally, it offers risk mitigation tracking capabilities, enabling organizations to track and manage the methods used to address identified risks.

By combining these features, the invention in an embodiment provides a comprehensive, ERP-specific security monitoring and compliance tool that addresses the shortcomings of existing solutions. It empowers organizations to maintain a robust security posture throughout the lifecycle of their ERP implementation and beyond.

DETAILED DESCRIPTION

The preferred embodiment of an embodiment of the invention is a comprehensive security monitoring and compliance tool specifically designed for Enterprise Resource Planning (ERP) systems, such as for example, Workday. This embodiment addresses the critical need for robust security measures in ERP environments by offering a suite of features that work in concert to provide continuous monitoring, periodic assessments, and advanced analytics.

Figure 1:
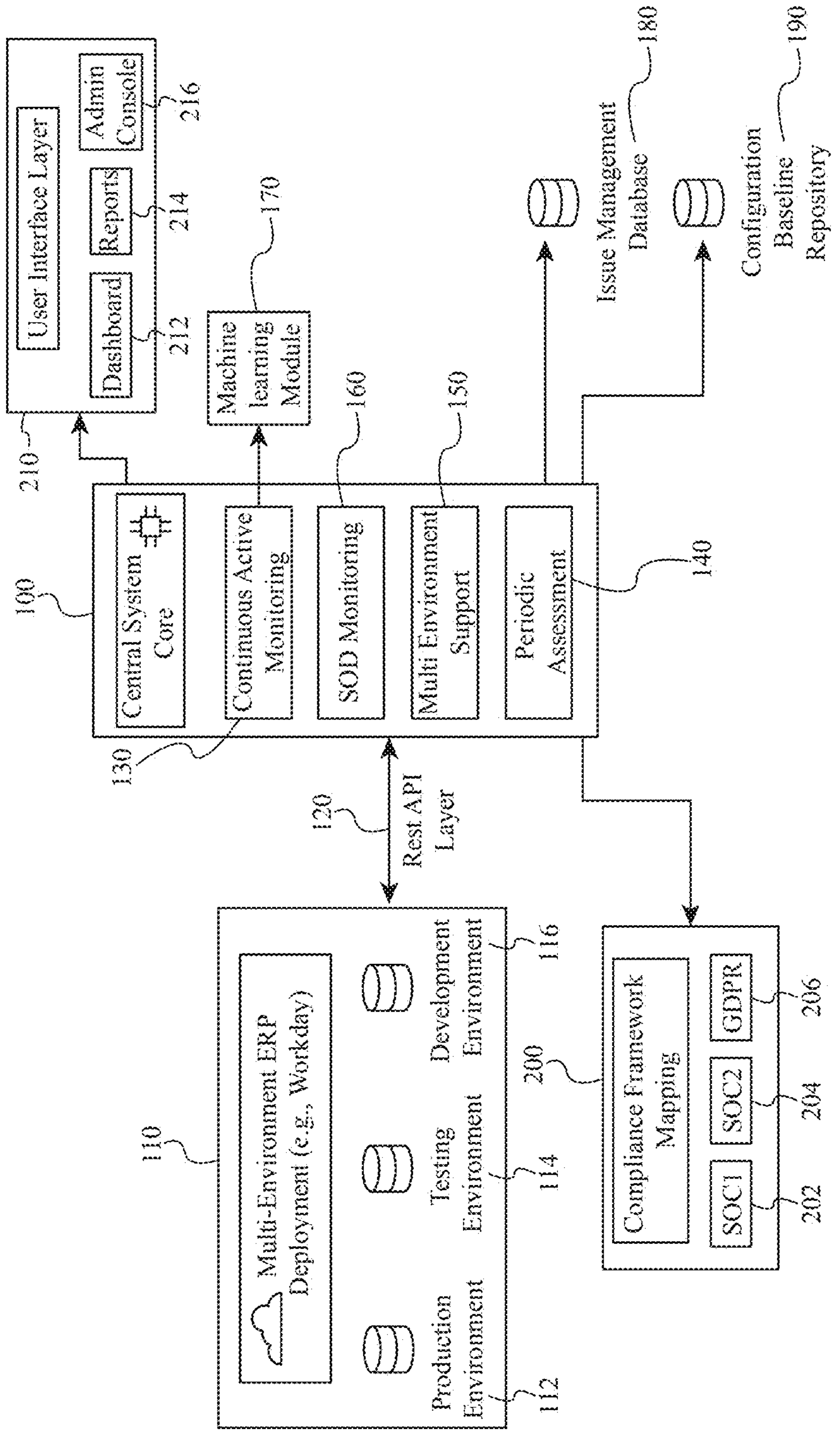
FIG. 1 presents a diagram illustrating a high-level system architecture of the ERP security monitoring and compliance system, showing the user interface layer connecting to a central system core that includes dashboard, reporting, and administrative console components in accordance with an embodiment.

FIG. 1 illustrates a high-level system architecture in accordance with an embodiment of the invention. A Central System (100) serves as the hub for monitoring and compliance. This system communicates with a Multi-Environment ERP Deployment (110), which may be a platform such as Workday, via a Rest API Layer (120). The ERP deployment (110) can include multiple instances, such as a Production Environment (112), a Testing Environment (114), and a Development Environment (116). The Central System (100) comprises several interconnected modules, including a Central System Core (130), a Continuous Active Monitoring module (130), a SOD Monitoring module (160), a Multi Environment Support module (150), and a Periodic Assessment module (140). A Machine learning Module (170) also interfaces with the Central System Core (130). The Periodic Assessment module (140) is shown interfacing with a Compliance Framework Mapping (200), which maps controls to specific standards such as SOC1 (202), SOC2 (204), and GDPR (206). Outputs from the system, such as identified issues and configuration data, are stored in an Issue Management Database (180) and a Configuration Baseline Repository (190). A User Interface Layer (210) provides user access to the system's functions, including a Dashboard (212), Reports (214), and an Admin Console (216).

Figure 2:
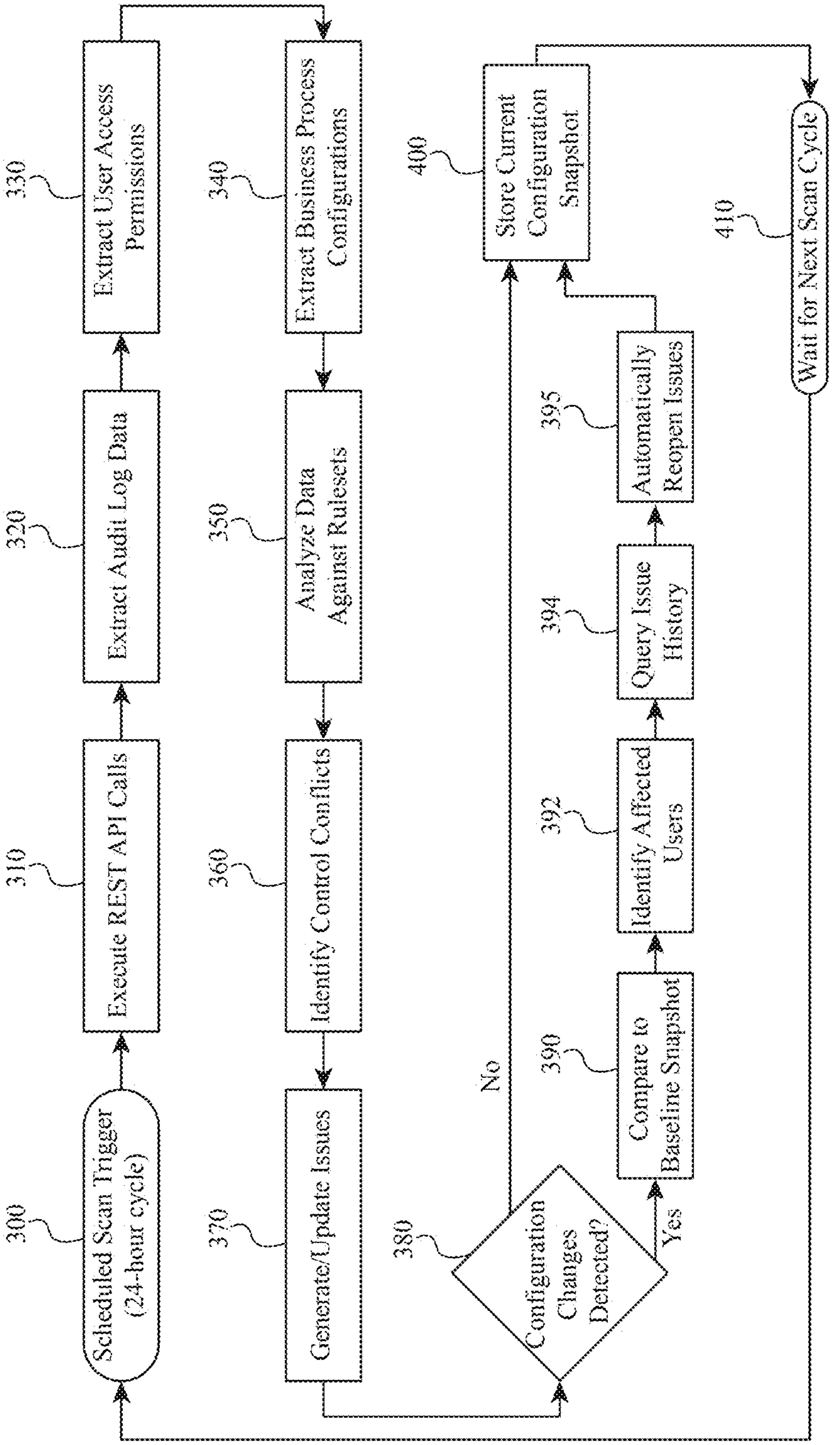
FIG. 2 presents a diagram showing the automated scanning workflow process, illustrating a scheduled scan trigger mechanism that initiates a sequence of REST API calls to extract audit log data, user access permissions, and business process configurations from ERP environments in accordance with an embodiment.

FIG. 2 presents an automated scanning workflow process in accordance with an embodiment of the invention. The process begins with a Scheduled Scan Trigger (300), which in an exemplary embodiment operates on a 24-hour cycle. This trigger initiates the step to Execute REST API Calls (310), which in turn enables the extraction of various data types from the ERP system, including Extract Audit Log Data (320), Extract User Access Permissions (330), and Extract Business Process Configurations (340). Once extracted, the data proceeds to Analyze Data Against Rulesets (350). This analysis allows the system to Identify Control Conflicts (360) and subsequently Generate/Update Issues (370) in the issue management database. A parallel process checks if Configuration Changes Detected? (380). If 'Yes', the system will Compare to Baseline Snapshot (390) to Identify Affected Users (392). The system will then Query Issue History (394) for those users and Automatically Reopen Issues (395) that were previously remediated but are now active again due to the configuration change. Following this branch, or if 'No' configuration changes were detected, the system will Store Current Configuration Snapshot (400) to be used as the baseline for the next comparison. The process then concludes and will Wait for Next Scan Cycle (410).

Figure 3:
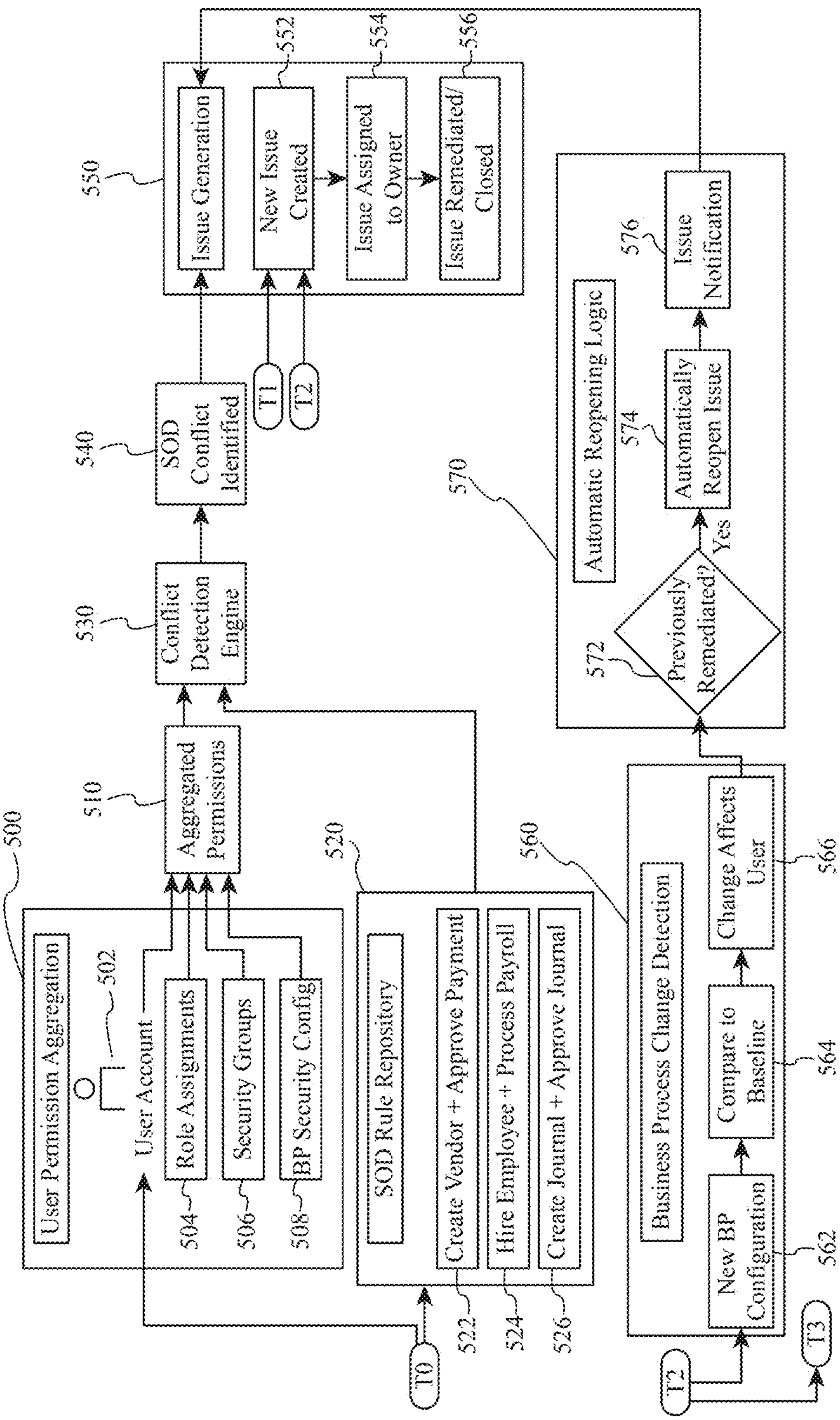
FIG. 3 presents a diagram showing the user permission aggregation and segregation of duties conflict detection process, showing how user accounts, role assignments, security groups, and business process security configurations are analyzed by a conflict detection engine against SOD rule repositories in accordance with an embodiment.

FIG. 3 depicts the user permission aggregation and segregation of duties (SOD) conflict detection process in accordance with an exemplary embodiment. The process begins with User Permission Aggregation (500), which collects data associated with a User Account (502). This data includes the user's Role Assignments (504), Security Groups (506), and any relevant BP Security Config (508) (Business Process Security Configuration). These elements are compiled into a user's total Aggregated Permissions (510), which are then fed into the Conflict Detection Engine (530). This engine (530) analyzes the permissions against a SOD Rule Repository (520). This repository (520) contains predefined rules for incompatible duties, such as Create Vendor+Approve Payment (522), Hire Employee+Process Payroll (524), and Create Journal+Approve Journal (526). If the engine finds a conflict, an SOD Conflict Identified (540) event is triggered, which initiates the Issue Generation (550) workflow. This workflow includes steps where a New Issue Created (552), the Issue Assigned to Owner (554), and eventually, the Issue Remediated/Closed (556). In parallel, the system performs Business Process Change Detection (560). This module receives the New BP Configuration (562)(from 508) and will Compare to Baseline (564) to determine if the Change Affects User (566) associated with a previously remediated conflict. If it does, the Automatic Reopening Logic (570) is initiated. It checks if the issue was Previously Remediated? (572), and if 'Yes', it will Automatically Reopen Issue (574) and send an Issue Notification (576).

Figure 4:
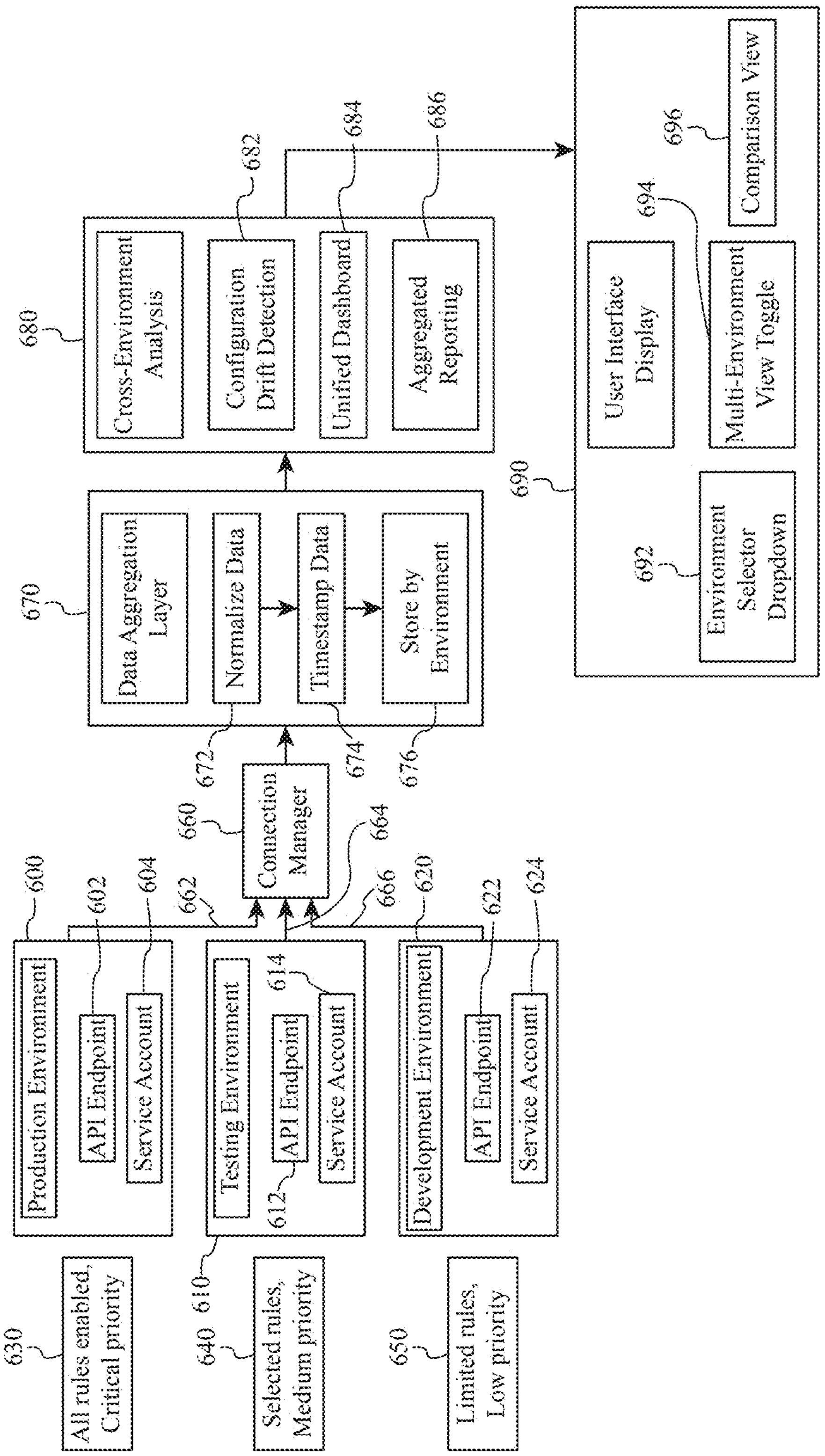
FIG. 4 presents a diagram demonstrating the multi-environment monitoring architecture, showing simultaneous connections to production, testing, and development environments with environment-specific API endpoints and service accounts in accordance with an embodiment.

FIG. 4 demonstrates the multi-environment monitoring architecture in accordance with an embodiment of the invention. The system is configured to connect simultaneously to multiple, distinct ERP environments, such as a Production Environment (600), a Testing Environment (610), and a Development Environment (620). Each environment is accessed using specific credentials, including an API Endpoint (602, 612, 622) and a Service Account (604, 614, 624). In an exemplary embodiment, scanning rules and priorities are customized for each environment; for example, the Production Environment (600) may have All rules enabled, Critical priority (630), the Testing Environment (610) may have Selected rules, Medium priority (640), and the Development Environment (620) may have Limited rules, Low priority (650). A Connection Manager (660) manages these individual connections (662, 664, 666) and forwards the data to a Data Aggregation Layer (670). Within this layer, the system will Normalize Data (672), Timestamp Data (674), and Store by Environment (676). This processed data enables Cross-Environment Analysis (680), a key feature of which is Configuration Drift Detection (682). The analyzed data is then presented to the user through a Unified Dashboard (684) and Aggregated Reporting (686). These components populate the main User Interface Display (690), which, in an embodiment, includes interactive elements such as an Environment Selector Dropdown (692), a Multi-Environment View Toggle (694), and a Comparison View (696) for detailed analysis.

Figure 5:
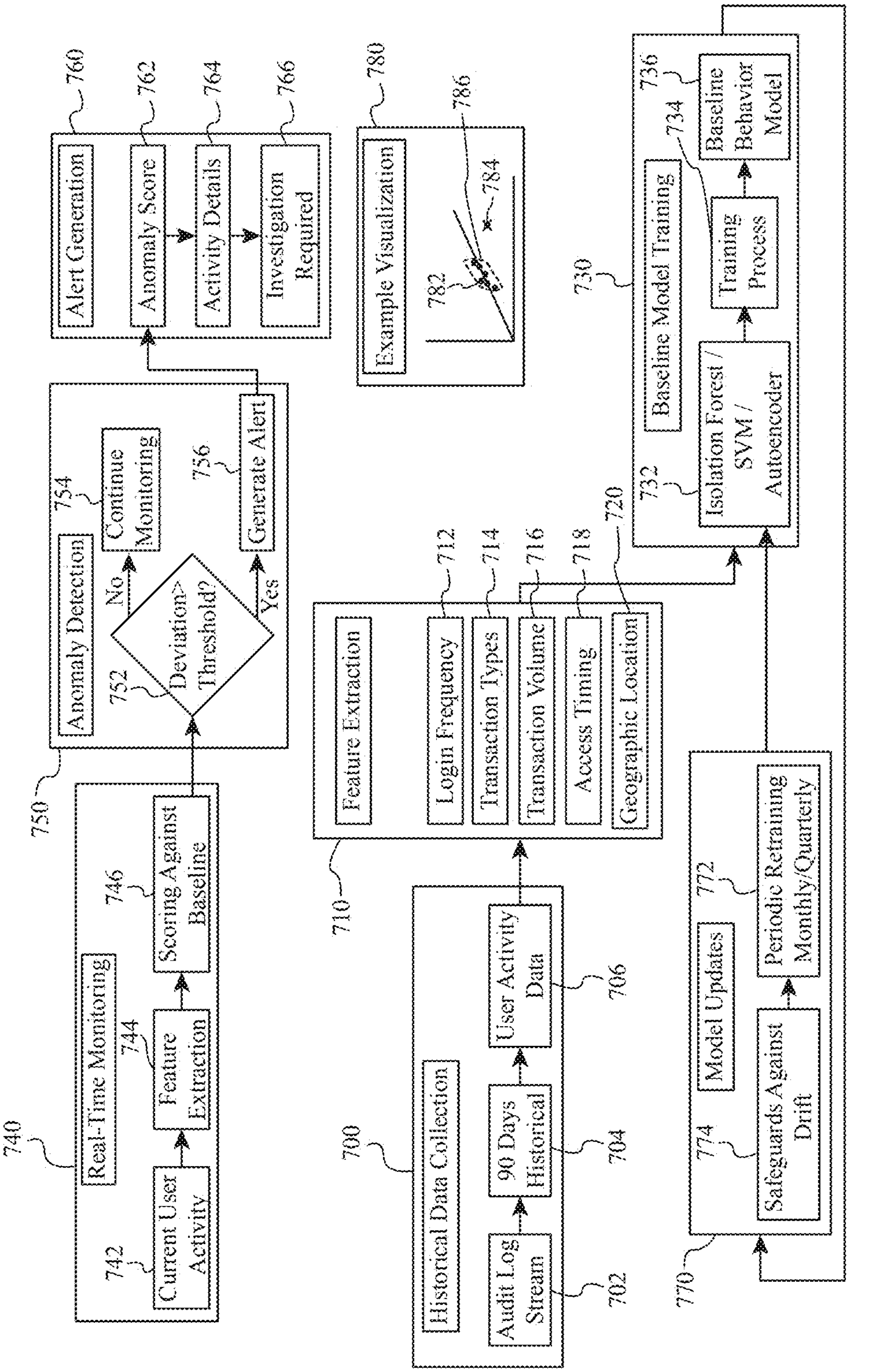
FIG. 5 presents a diagram showing the real-time monitoring and anomaly detection system powered by machine learning algorithms in accordance with an embodiment.

FIG. 5 illustrates the real-time monitoring and anomaly detection system in accordance with an embodiment of the invention. This system relies on establishing a behavioral baseline through Baseline Model Training (730). This training process starts with Historical Data Collection (700), which gathers User Activity Data (706) from sources like an Audit Log Stream (702) or a 90 Days Historical (704) data store. A Feature Extraction (710) process identifies key behavioral attributes, such as Login Frequency (712), Transaction Types (714), Transaction Volume (716), Access Timing (718), and Geographic Location (720). This data is used in a Training Process (734), utilizing machine learning algorithms like Isolation Forest/SVM/Autoencoder (732), to create a Baseline Behavior Model (736). Once the model is active, the Real-Time Monitoring (740) module observes Current User Activity (742). It applies Feature Extraction (744) to this new activity and performs Scoring Against Baseline (746). The Anomaly Detection (750)module then checks if the Deviation>Threshold? (752). If 'No', the system will Continue Monitoring (754). If 'Yes', it will Generate Alert (756). This triggers an Alert Generation (760) process, which provides an Anomaly Score (762), Activity Details (764), and flags the event for Investigation Required (766). An Example Visualization (780) may be provided, showing an anomalous point (782) falling outside a cluster of normal behavior (784) and beyond a predefined threshold (786). To keep the model current, Model Updates (770) are performed, including Periodic Retraining (772)and Safeguards Against Drift (774).

Figure 6:
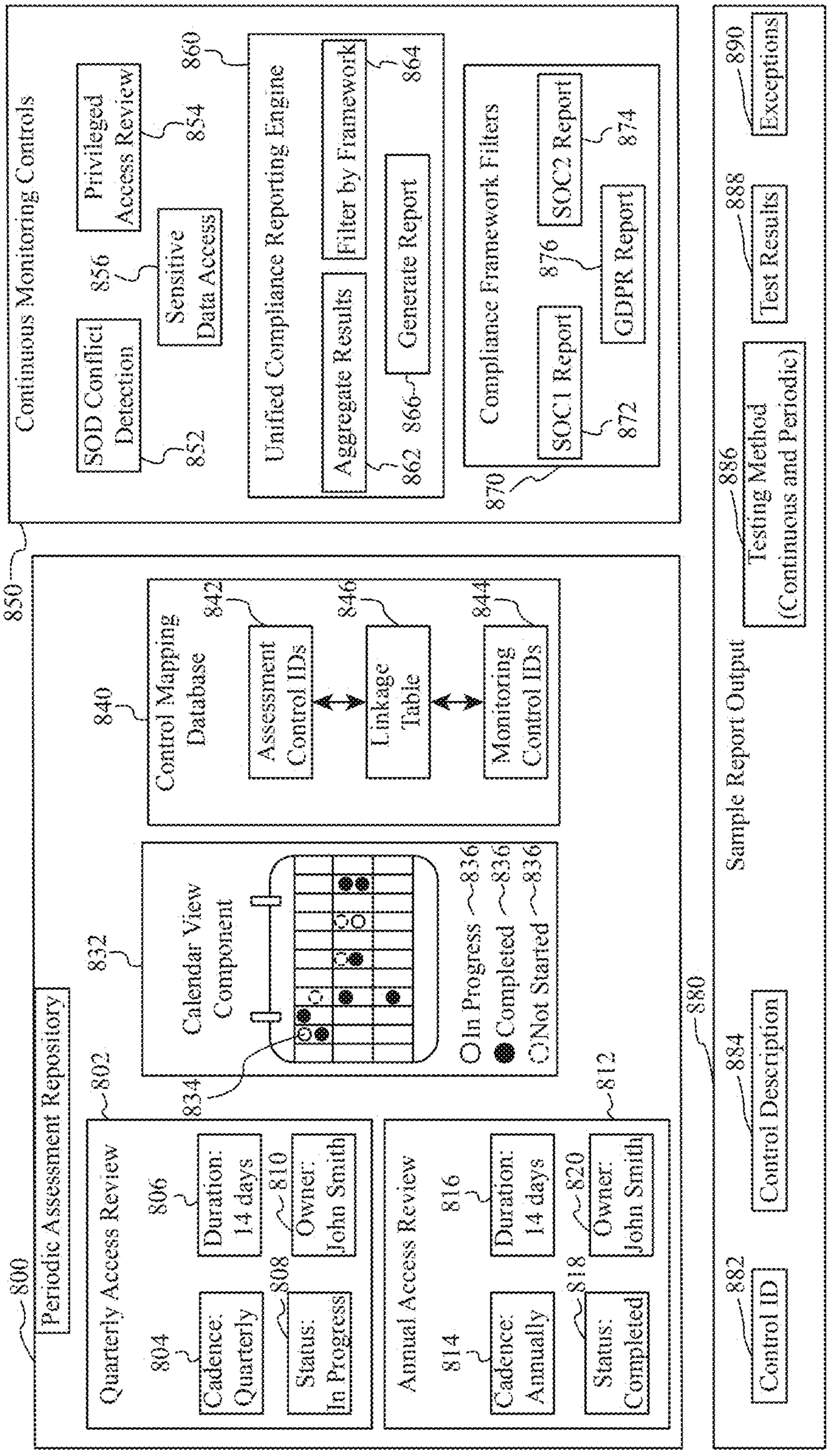
FIG. 6 presents a diagram illustrating the integration between continuous monitoring controls and periodic assessment repositories, showing calendar view components for managing quarterly and annual access reviews with configurable cadence, duration, and ownership parameters in accordance with an embodiment.

FIG. 6 illustrates the integration between periodic and continuous monitoring controls in accordance with an embodiment of the invention. The system includes a Periodic Assessment Repository (800), which manages scheduled audit tasks. Examples include a Quarterly Access Review (802) and an Annual Access Review (812). Each assessment is defined by parameters such as its Cadence (804, 814), Duration (806, 816), Status (808, 818), and assigned Owner (810, 820). A Calendar View Component (832) provides a visual representation (834) of these tasks, often with a legend (836) indicating items that are 'On Progress', 'Completed', or 'Not Started'. In parallel, the system operates Continuous Monitoring Controls (850), which include automated checks such as SOD Conflict Detection (852), Sensitive Data Access (854) monitoring, and Privileged Access Review (856). A Control Mapping Database (840) integrates these two modules. It uses a Linkage Table (846) to connect Assessment Control IDs (842) from the periodic repository with Monitoring Control IDs (844) from the continuous module. Data from both sources is fed into a Unified Compliance Reporting Engine (860). This engine can Aggregate Results (862), Filter by Framework (864), and Generate Report (866). The engine uses Compliance Framework Filters (870) to generate framework-specific outputs like a SOC1 Report (872), GDPR Report (874), or SOC2 Report (876). A Sample Report Output (880) demonstrates a typical report structure, detailing the Control ID (882), Control Description (884), the Testing Method (886), Test Results (888), and any identified Exceptions (890).

Figure 7:
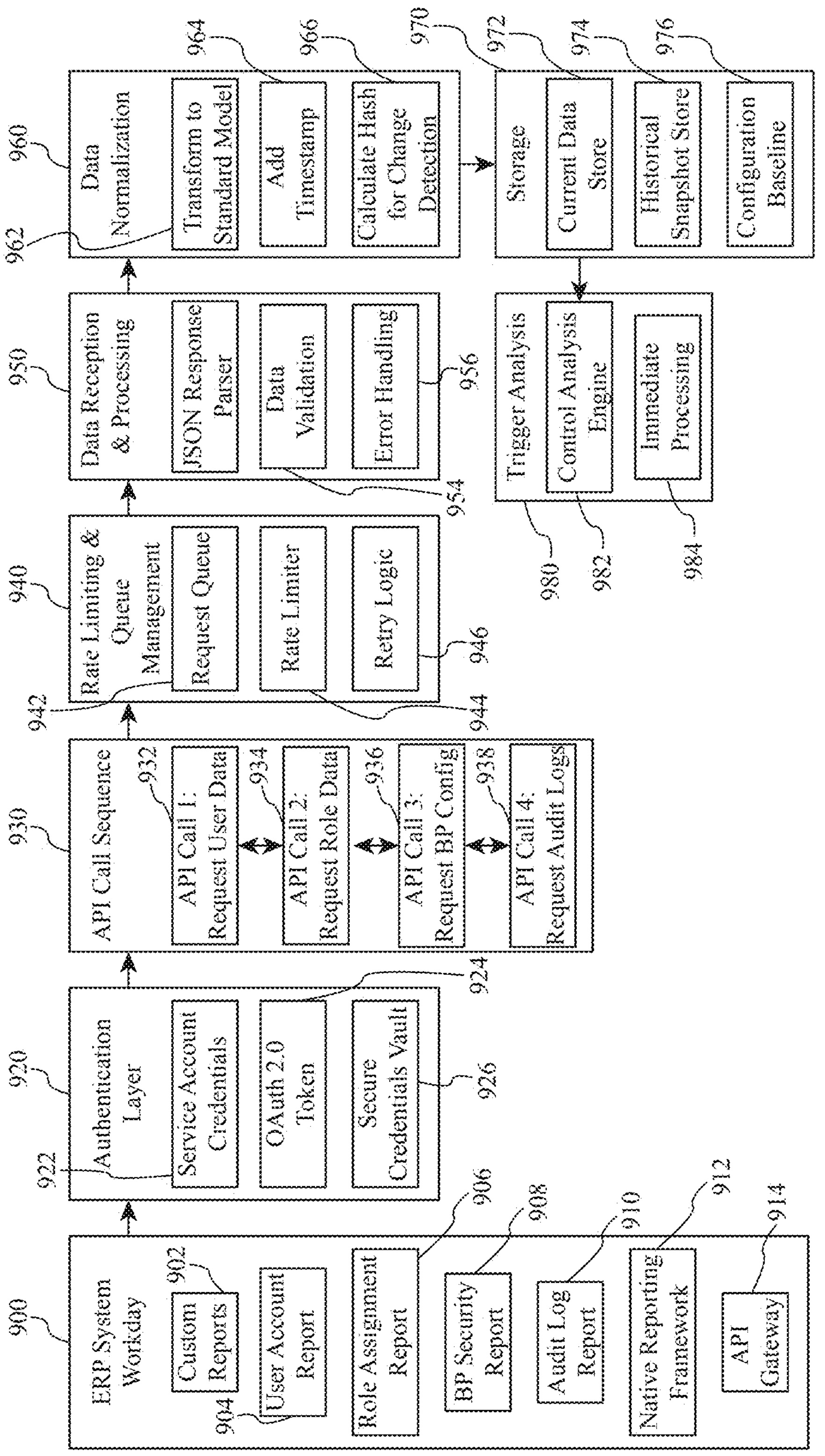
FIG. 7 presents a diagram showing the detailed ERP system integration architecture, specifically showing Workday integration through authentication layers, API call sequences for requesting user data, role data, business process configurations, and audit logs in accordance with an embodiment.

FIG. 7 provides a detailed ERP system integration architecture, showing a Workday integration in accordance with an exemplary embodiment. The process originates with the ERP System Workday (900), which utilizes its Native Reporting Framework (912) to generate Custom Reports (902). These reports are the data source for the monitoring system and include items such as a User Account Report (904), Role Assignment Report (906), BP Security Report (908), and Audit Log Report (910). This data is made available through an API Gateway (914). To access this data, the monitoring system first interacts with an Authentication Layer (920), using Service Account Credentials (922) or an OAuth 2.0 Token (924) retrieved from a Secure Credentials Vault (926). Once authenticated, the system executes an API Call Sequence (930) to retrieve the data from the custom reports. This sequence may include API Call 1: Request User Data (932), API Call 2: Request Role Data (934), API Call 3: Request BP Config (936), and API Call 4: Request Audit Logs (938). These calls are managed by a Rate Limiting & Queue Management (940) module, which uses a Request Queue (942), a Rate Limiter (944), and Retry Logic (946) to ensure stable communication with the ERP's API.

Continuing with FIG. 7, once the data is retrieved, it enters the Data Reception & Processing (950) module. This module (950) employs a JSON Response Parser (952) to interpret the incoming data, performs Data Validation (954) to check for integrity, and utilizes Error Handling (956) for any non-standard responses. Following reception, the data moves to Data Normalization (960). Here, the data is transformed via a Transform to Standard Model (962) step for consistent analysis, an Add Timestamp (964) step is performed, and the system may Calculate Hash for Change Detection (966). This normalized data is then passed to Storage (970), where it populates a Current Data Store (972), a Historical Snapshot Store (974), and a Configuration Baseline (976). This data persistence, in turn, allows the system to Trigger Analysis (980), feeding the data into the Control Analysis Engine (982) for Immediate Processing (984) to identify security and compliance issues.

At the core of the preferred embodiment of the invention is the Continuous Active Monitoring (CAM) feature, which performs daily scans of the Workday environment to identify and report any control conflicts within predefined Control Categories. These categories encompass System Access Changes, User Access Changes, Segregation of Duties, Proxy Activity Monitoring, and Configuration Changes. The CAM feature allows for customizable scanning across different Workday environments, such as Production and Testing, enabling organizations to tailor their security monitoring to their specific needs.

Complementing the CAM feature in an embodiment is the Periodic Assessment Tool (PAT), a unique offering in the Workday ERP ecosystem. PAT serves as a centralized repository for tracking and executing periodic audit activities, allowing organizations to maintain ongoing compliance and risk management. This feature offers customizable review activities, flexible scheduling, and the ability to link PAT controls directly to CAM controls, providing a comprehensive approach to security management.

An embodiment of the invention includes a Continuous Active Monitoring (CAM) feature that performs scans of the Workday environment every 24 hours. This feature is designed to identify and report any control conflicts within predefined Control Categories.

The CAM feature operates by leveraging custom reports built within Workday to pull all necessary source data for each control. This data is then extracted out of Workday via standard REST APIs into the system.

The 24-hour scanning cycle ensures that security monitoring is up-to-date and responsive to changes in the Workday environment in an exemplary embodiment.

The scanning process is customizable in accordance with an embodiment, allowing users to dictate which Workday environments they want to conduct CAM scans against. For example, an organization can choose to scan just their Production environment, or both Production and Testing environments.

In the context of the preferred embodiment, Production and Testing environments refer to distinct instances of an ERP system that serve different purposes within an organization. The Production environment is where all "real world" transactions and data are processed, representing the live, operational system used for day-to-day business activities. In contrast, Testing environments are copies of Production data that can be refreshed at different cadences, which are used to test configuration changes before implementing them in the Production environment. Some organizations may elect to have multiple or one Testing environment(s). This multi-environment setup allows organizations to maintain a stable operational system while having a separate space to experiment with and validate changes without risking disruption to ongoing business processes.

The continuous active monitoring module leverages REST (Representational State Transfer) API integration to extract data from ERP environments without requiring direct database access or custom integrations within the ERP system itself. This approach provides several technical advantages, including platform independence, reduced impact on ERP system performance, and compatibility with cloud-based ERP systems that restrict direct database access for security reasons.

In a preferred embodiment utilizing Workday as the ERP system, the continuous active monitoring module uses custom reports built within Workday's native reporting framework. These custom reports are configured to extract specific data elements required for security monitoring, including user account information, role assignments, business process security group memberships, security policy configurations, and audit log entries. The custom reports are configured with appropriate filters and parameters to extract only the data necessary for security analysis, minimizing data transfer volumes and API call overhead.

The REST API calls are executed in accordance with an embodiment using Integration System User (ISU) accounts or service accounts with read-only access permissions. Authentication is performed using OAuth 2.0 or similar secure authentication protocols, with refresh tokens stored in encrypted format within the monitoring system's secure credential vault. API calls are executed on a scheduled basis, with the default configuration performing comprehensive scans every 24 hours, though this interval is configurable based on organizational requirements and ERP system performance considerations.

The extracted data is processed and normalized into a standardized data model within the monitoring system's database. This normalization enables consistent analysis across different ERP systems and versions, facilitating multi-platform support. Data extraction timestamps are recorded with each scan to enable temporal analysis and change detection between successive scans.

The 24-hour scanning cycle in accordance with an embodiment provides continuous monitoring while balancing system performance, data currency, and resource utilization. In a typical implementation, the scanning cycle begins with an API call to extract user account data, followed by sequential calls to extract role assignments, business process security configurations, and recent audit log entries. The sequence of API calls is optimized to minimize total extraction time while respecting API rate limits imposed by the ERP system.

The scanning schedule is configurable on an environment-specific basis. Production environments may be configured for more frequent scanning (e.g., every 12 hours or every 6 hours for high-security environments), while non-production environments may utilize less frequent scanning (e.g., every 48 hours or weekly) based on risk tolerance and resource availability. The scanning scheduler implements queue management to prevent overlapping scans and handles scan failures with automatic retry logic and alert generation for persistent failures.

Upon completion of each scan, the extracted data is immediately processed through the control analysis engine, which compares the current state against the configurable rulesets to identify control conflicts. This immediate processing ensures that newly identified issues are generated and assigned without delay, minimizing the window of exposure for security vulnerabilities.

The SOD analysis engine in accordance with an embodiment implements a sophisticated rule-based system for identifying incompatible function combinations that create fraud risks when assigned to a single user. SOD rules are defined using a flexible rule definition language that specifies pairs or sets of business functions that should not be combined within a single user's permissions.

Each SOD rule comprises several components: (1) a unique rule identifier; (2) a descriptive name explaining the conflict type; (3) a list of incompatible functions or permissions; (4) a risk severity rating (e.g., Critical, High, Medium, Low); (5) applicable compliance framework mappings (e.g., SOC1, SOC2, GDPR); and (6) optional business context descriptions explaining why the combination creates risk. For example, an SOD rule might specify that the "Create Vendor" permission and "Approve Payment" permission are incompatible because a user with both permissions could create fraudulent vendors and authorize payments without requiring approval from another individual.

During each scan cycle, the SOD analysis engine extracts each user's complete permission set by aggregating all permissions granted through direct role assignments, security group memberships, and business process security configurations. This aggregated permission set is then compared against each active SOD rule to identify conflicts. When a user's aggregated permissions match the incompatible function combinations specified in an SOD rule, a control conflict is identified.

The SOD analysis engine implements a critical technical feature in accordance with an embodiment: automatic issue reopening based on business process definition changes. To enable this capability, the system maintains a baseline snapshot of business process security configurations from each scan cycle. During subsequent scans, the current business process security configurations are compared against the previous baseline to identify any changes. Changes are analyzed to determine whether they affect users who previously had SOD issues that were marked as remediated or closed.

Specifically, in accordance with an embodiment, when a business process definition change is detected, the system identifies all users whose permissions are affected by the change. For each affected user, the system queries the issue history database to determine whether that user previously had any SOD issues that were marked as resolved through mitigating controls, exception approval, or user termination/role change. If the business process definition change grants the user permissions that reintroduce a previously resolved SOD conflict, the system automatically reopens the associated issue, assigns it back to the responsible remediation owner, and includes detailed information about the business process change that caused the issue to be reopened.

This automatic reopening capability addresses a critical gap in prior art systems, which required manual review to detect when remediated issues were reintroduced through configuration changes. By automatically detecting and reopening these issues, the present invention ensures that previously identified risks do not inadvertently reappear without visibility to security and compliance teams.

The multi-environment support module in accordance with an embodiment enables simultaneous monitoring of multiple ERP instances, including production, testing, development, training, and sandbox environments. Each environment is configured as a separate monitoring target with its own connection parameters, including API endpoint URLs, authentication credentials, and environment-specific metadata.

Environment-specific control scanning configurations enable organizations to apply different rulesets or rule sensitivities to different environments based on risk levels. For example, production environments may have all SOD rules enabled with strict enforcement, while development environments may have certain SOD rules disabled or configured to generate lower-severity issues, recognizing that developers may require broader access permissions for testing purposes that would be inappropriate in production.

The multi-environment architecture in accordance with an embodiment aggregates monitoring results across environments into a unified dashboard interface, enabling security and compliance teams to view security posture across all environments simultaneously. Cross-environment comparison features enable identification of configuration drift, where security configurations diverge between environments, potentially indicating incomplete change management processes or unauthorized modifications.

In an advanced embodiment, the system incorporates machine learning capabilities to identify anomalous user behavior patterns that may indicate security threats even when explicit access control violations are not present. The machine learning module analyzes audit log data extracted from the ERP environment to establish baseline behavior models for individual users and user populations.

Behavioral features analyzed include login frequency and timing patterns, geographical locations of access (when available), types of transactions performed, frequency of specific transaction types, data volumes accessed or modified, and patterns of business object access (e.g., which employees' records a user accesses in an HRIS system). Machine learning algorithms, such as isolation forests, one-class support vector machines, or neural network autoencoders, are trained on historical data to learn normal behavior patterns.

During ongoing monitoring, current user activities are scored against the learned baseline models. Activities that deviate significantly from the established baseline (exceeding configurable threshold values) are flagged as anomalous and generate alerts for investigation. For example, if a user who typically performs 10-20 vendor payment transactions per week suddenly performs 200 transactions in a single day, this deviation would be flagged as anomalous even if the user has legitimate permissions to perform those transactions.

The machine learning models in accordance with an embodiment are retrained periodically (e.g., monthly or quarterly) to adapt to evolving business processes and changing user responsibilities. The system implements safeguards to prevent "baseline drift," where malicious activities gradually become incorporated into the baseline model if they occur consistently over time. These safeguards include human review of significant baseline changes and exclusion of activities that occurred during known security incidents from training data.

The system in accordance with an embodiment maintains detailed mappings between monitoring controls (both continuous active monitoring controls and periodic assessment controls) and specific compliance framework requirements. Each control in the system is tagged with applicable framework identifiers, enabling filtered reporting based on the selected compliance framework.

For SOC1 compliance, the system in accordance with an embodiment maps controls to relevant Trust Services Criteria, particularly those related to logical and physical access controls (CC6.1, CC6.2, CC6.3) and change management (CC8.1). For SOC2 compliance, the system includes additional mappings for Security and Confidentiality criteria. For GDPR compliance, the system maps controls to specific GDPR articles, particularly Article 32 (Security of Processing) and Article 5 (Principles Relating to Processing of Personal Data).

Compliance reports in accordance with an embodiment are generated by filtering the complete set of monitoring results based on the selected framework's control mappings. This approach enables organizations to demonstrate compliance with multiple frameworks simultaneously from a single set of monitoring activities, rather than requiring separate monitoring processes for each framework. Reports include control descriptions, testing procedures, test results, identified exceptions, and remediation status for each exception, formatted to align with auditor expectations for the selected framework.

The preferred embodiment of the invention is designed to support and monitor multiple types of environments, recognizing that despite one environment being used for real-world transactions, all environments contain sensitive data and require security monitoring. This flexibility enables organizations to tailor their security monitoring to their specific needs and risk profiles.

Furthermore, an embodiment comprises a user interface configuration wherein users may specify which controls they want to scan for in each environment in accordance with embodiments. This granular control allows for different levels of monitoring across various Workday instances in an exemplary embodiment. For instance, an organization might choose to scan for all controls in their Production environment, but only a subset of critical controls in their Testing environment, allowing for a comprehensive risk management strategy Each control within the CAM feature in an embodiment is assigned a different priority level (low, medium, high, critical). When the CAM scan identifies a conflict, it generates an Issue within the system, which is then reported based on its assigned priority.

The present inventor has realized that in an embodiment this prioritization helps organizations focus on the most critical security concerns first.

The CAM feature interacts with other aspects of the preferred embodiment in several ways:

- Integration with the Periodic Assessment Tool (PAT): CAM controls can be directly linked to PAT controls, providing a comprehensive approach to security management that combines continuous monitoring with scheduled assessments.
- Multi-Environment Support: The CAM feature's ability to scan multiple Workday environments aligns with the system's overall design to support multi-environment deployments.
- Segregation of Duties (SOD) Analysis: The CAM feature's scans contribute to the advanced SOD analysis by identifying potential conflicts in user access and permissions.
- Compliance Support: The continuous monitoring provided by CAM supports compliance efforts by ensuring that out-of-the-box controls aligned with SOC1, SOC2, and GDPR requirements are regularly checked.

By performing these scans every 24 hours, the CAM feature ensures that organizations have a near real-time view of their Workday security posture, enabling them to quickly identify and address potential security issues or compliance violations.

An embodiment of the invention comprise a Periodic Assessment Tool (PAT) that serves as a centralized repository for tracking and executing periodic audit activities within the Workday ERP environment. The PAT is designed to address the need for ongoing, periodic security assessments to monitor risk and take remediating action when necessary.

The PAT allows organizations to customize their review activities, cadences, durations, owners, and approvers to suit their specific security and compliance needs. For example, an organization can set up a monthly review of new Earnings created to mitigate the risk of unauthorized changes to payroll. Each control in the PAT can be configured with the following attributes:

Cadence: How often the review will be conducted (e.g., monthly, quarterly, annually)

- Duration: The expected time frame for completing the review
- Owner: The individual or role responsible for performing the review
- Approver: The individual or role responsible for signing off on the review
- Environment: Which ERP (e.g. Workday) environment (e.g., Production, Testing) should be evaluated as part of this item The PAT feature includes a calendar view that allows users to visualize upcoming audit activities. This view helps organizations plan and manage their security and compliance efforts more effectively by providing a clear overview of scheduled reviews and assessments.

A key aspect of the PAT is its ability to link PAT controls directly to Continuous Active Monitoring (CAM) controls. This integration provides a comprehensive approach to security management by combining scheduled assessments with continuous monitoring. For instance, a PAT control for reviewing Segregation of Duties conflicts can be linked to the corresponding CAM control that continuously monitors for such conflicts.

The PAT integrates with other aspects of the system in several ways in accordance with an exemplary embodiment:

- Integration with CAM: As mentioned, PAT controls can be linked to CAM controls, allowing organizations to correlate periodic assessments with continuous monitoring results.
- Multi-Environment Support: Like the CAM feature, the PAT supports multiple ERP (e.g. Workday) environments, allowing organizations to schedule and manage audit activities across both Production and Testing environments.
- Documentation and Reporting: The PAT allows users to attach and upload supporting documentation for each control, facilitating comprehensive audit trails. This feature integrates with the system's reporting capabilities in accordance with an embodiment, enabling organizations to generate evidence of continuous controls for auditors.
- Compliance Support: The PAT contributes to compliance efforts by providing a structured approach to periodic reviews of security controls, including those aligned with SOC1, SOC2, and GDPR requirements.

By providing these features and integrations, the PAT enables organizations to maintain a proactive and structured approach to security and compliance management within their Workday ERP environment, complementing the continuous monitoring provided by the CAM feature.

An embodiment of the invention includes out-of-the-box controls that support compliance with SOC1, SOC2, and GDPR requirements. This feature is designed to reduce the burden on organizations to manually map their security controls to various compliance frameworks.

The system in an exemplary embodiment provides pre-configured controls that align with the requirements of these widely-used compliance standards:

- SOC1 (Service Organization Control 1): Focuses on financial reporting controls
- SOC2 (Service Organization Control 2): Addresses security, availability, processing integrity, confidentiality, and privacy
- GDPR (General Data Protection Regulation): Covers data protection and privacy for individuals within the European Union These controls in an embodiment integrate with other aspects of the system, including:

- Continuous Active Monitoring (CAM): The CAM feature regularly checks these pre-configured controls to ensure ongoing compliance.
- Periodic Assessment Tool (PAT): Organizations can schedule and manage periodic reviews of these compliance-related controls using the PAT.
- Multi-Environment Support: The compliance controls can be applied and monitored across multiple Workday environments, ensuring consistent compliance across Production and Testing instances.

By providing these pre-configured compliance controls, the system enables organizations to streamline their compliance efforts and maintain adherence to important regulatory standards within their Workday ERP environment.

An embodiment of the invention includes multi-environment support, providing the capability to connect to and monitor multiple Enterprise Resource Planning (ERP) (e.g. Workday) environments. This feature recognizes the complex nature of modern ERP deployments and allows organizations to maintain comprehensive security monitoring across all their Workday instances.

The system in an exemplary embodiment can connect to and monitor multiple Workday environments simultaneously, including both Production and Testing environments. This capability is particularly valuable for organizations managing multiple environments with varying security requirements.

The multi-environment support feature integrates with other aspects of the system in an embodiment, including:

- Continuous Active Monitoring (CAM): Users can customize which controls they want to scan for in each environment. For example, an organization might choose to scan for all controls in their Production environment, but only a subset of critical controls in their Testing environment.
- Periodic Assessment Tool (PAT): The PAT allows users to define which Workday environment (e.g., Production, Testing) should be evaluated as part of each audit activity.

By supporting multiple environments, the system ensures that organizations can maintain a comprehensive and consistent security posture across all their Workday instances, regardless of their purpose or data sensitivity.

Embodiments of the invention comprise Sensitive and Privileged Access Monitoring capabilities, which in an exemplary embodiment allow organizations to define and monitor sensitive and privileged access within their Workday ERP environment. This aspect provides greater transparency and control over access to critical data and functions.

The system allows users to define Domains or Business Processes as Sensitive or Privileged in accordance with an exemplary embodiment, enabling more targeted monitoring and analysis of access to these critical areas. In accordance with an embodiment, domains are defined as groupings of tasks, data sources, data fields, and reports, which may contain varying levels of sensitive information.

Sensitive access generally relates to employees and workers, including access to personal identifiers (e.g., SSN, National ID), performance information, benefit information, payroll information, compensation information, student information, and organization financial information.

Privileged access, on the other hand, grants users the ability to perform high-stakes system configurations (e.g., Create Payroll Earnings/Deductions) or provides significant operational authority (e.g., Approver for $1 m transactions).

The system provides a default definition for data elements considered Sensitive or Privileged, but these definitions can be fully configured to client specifications, allowing organizations to tailor the monitoring to their specific security and compliance needs.

This feature integrates with other aspects of the system, including:

- Continuous Active Monitoring (CAM): the CAM Feature Includes Monitoring of User Access Changes, which encompasses tracking changes to sensitive and privileged access rights.
- Periodic Assessment Tool (PAT): Organizations can set up periodic reviews of sensitive and privileged access as part of their regular audit activities.
- Segregation of Duties (SOD) Analysis: The system can identify potential conflicts involving sensitive or privileged access rights, enhancing the overall security posture.

The system in an exemplary embodiment incorporates advanced Segregation of Duties (SOD) analysis, utilizing a configurable ruleset to identify potential conflicts. A key aspect of an embodiment of the invention is the automatic reopening of previously closed issues based on changes in Business Process Definitions or entry conditions, ensuring that security assessments remain current and accurate even as the ERP environment evolves.

By providing these capabilities, the Sensitive and Privileged Access Monitoring feature enables organizations to maintain strict control over access to critical data and functions within their Workday environment, supporting compliance efforts and reducing the risk of data breaches or unauthorized actions.

An embodiment of the invention integrates seamlessly specifically with an ERP system such as Workday, leveraging custom reports built within the ERP system to pull source data via standard REST APIs. This integration allows for efficient data extraction and analysis without compromising the integrity of the Workday environment in accordance with an exemplary embodiment.

To support compliance efforts, the system provides out-of-the-box controls that align with SOC1, SOC2, and GDPR requirements. This feature significantly reduces the burden on organizations to manually map their security controls to various compliance frameworks.

An embodiment of the invention includes several control categories that are monitored and analyzed as part of its comprehensive security and compliance management approach for ERP systems, such as Workday, in accordance with an embodiment. These control categories comprise:

- System Access Changes: This category tracks changes that impact the scope of who or what can access a Workday environment. It is broken down into four subcategories: Account Management, Authentication, Password Rules, and System Security Settings. The system in an exemplary embodiment tracks and reports on these controls by pulling audit logs from Workday via REST API and identifying changes in attributes.
- User Access Changes: This category monitors changes that affect what users can access within a Workday environment. It is divided into three subcategories in an exemplary embodiment: Assignment Changes, Domain & Business Process Security Changes, and Permissions Review. Similar to System Access Changes, this category utilizes audit logs pulled from Workday via REST API to identify and report on changes.
- Segregation of Duties (SOD): This category focuses on identifying conflicting access rights that could potentially lead to security risks. The system in an exemplary embodiment provides a configurable ruleset for SOD concerns, defining which combinations of actions a user can perform that may conflict from a controls perspective. There are four ruleset methods through which someone can have an SOD conflict: Domain Modify Access+Domain Modify Access, Domain Modify Access+Initiate Business Process, and Initiate Business Process+Approve Business Process, and Initiate Business Process+Initiate Business Process.

Proxy Activity Monitoring: This category is designed to track and ensure that proxy permissions are not being abused. In non-production environments in accordance with an exemplary embodiment, some users may have the ability to "proxy" as other users, viewing Workday exactly as another user would. This feature monitors such activity to prevent misuse of sensitive information.

Configuration Changes: This category in an embodiment captures important configuration changes that don't necessarily fall into the other control categories but are still crucial to track. It includes monitoring changes made to existing security groups, edits to Business Process Definitions, creation of Custom Business Process Definitions, and edits made to existing security groups.

Anomalous Behavior Identification: This category in an exemplary embodiment comprises a machine learning engine to baseline standard behavior within the system and report on deviations to standard User Activity Behavior which may be indicative of a bad actor. Examples of suspicious activities that could be detected include unusual sign-on times or locations, irregular updates to direct deposit information, mass report downloads containing sensitive information, and irregular web-service operations that may indicate inappropriate data transfers.

These control categories in an embodiment relate to other aspects of the system, such as the Continuous Active Monitoring (CAM) feature and the Periodic Assessment Tool (PAT), to provide a comprehensive and proactive approach to security and compliance management within ERP environments.

The preferred embodiment of an embodiment of the invention is available both as a standalone Software-as-a-Service (SaaS) application and as a module within Workday, offering flexibility in deployment to suit different organizational needs and IT strategies.

An embodiment of the invention integrates seamlessly with Workday through custom reports built within the Workday ERP system and data extraction via standard REST APIs. This integration allows for efficient data collection and analysis without compromising the integrity of the Workday environment.

Custom reports are built within Workday to pull all necessary source data for each control monitored by the system. These reports are designed to capture specific data points relevant to the various Control Categories, such as System Access Changes, User Access Changes, Segregation of Duties, and Configuration Changes.

The system then leverages standard REST APIs provided by Workday to extract the data from these custom reports. This approach ensures that the data extraction process is secure, efficient, and compliant with Workday's integration standards.

The integration with Workday through custom reports and REST APIs supports several key features of the system:

Continuous Active Monitoring (CAM): The CAM feature utilizes the extracted data to perform its daily scans of the Workday environment, identifying and reporting any control conflicts within the predefined Control Categories.

Multi-Environment Support: The system can connect to and extract data from multiple Workday environments, including both Production and Testing environments, allowing for comprehensive security monitoring across all instances.

Periodic Assessment Tool (PAT): The integration supports the PAT by providing access to the necessary data for conducting periodic audit activities and reviews.

Sensitive and Privileged Access Monitoring: The custom reports and data extraction capabilities enable the system to monitor and analyze access to sensitive and privileged data and functions within Workday.

By leveraging custom reports and standard REST APIs, the system ensures that it can access the required data from Workday in a secure and efficient manner, supporting its comprehensive security monitoring and compliance management capabilities.

An embodiment of the invention includes customizable reporting capabilities, allowing users to generate reports on issues, controls, and audit activities. This feature enables organizations to gain comprehensive insights into their security and compliance posture within the Workday ERP environment.

The system in an embodiment allows for the generation of reports on:

Issues: When the Continuous Active Monitoring (CAM) feature identifies a control conflict, it generates an Issue within the system. These Issues can be reported on in various ways, providing users with a clear understanding of potential risks and security concerns.

Controls: Reports can be generated on the status and effectiveness of various controls across the different Control Categories, including System Access Changes, User Access Changes, Segregation of Duties, Proxy Activity Monitoring, and Configuration Changes.

Audit Activities: The Periodic Assessment Tool (PAT) allows for reporting on scheduled and completed audit activities, providing visibility into the organization's ongoing compliance efforts.

The customizable reporting feature integrates with other aspects of the system in an embodiment, such as the CAM and PAT, to provide a comprehensive view of the organization's security and compliance status within their Workday environment.

Additionally, an embodiment of the invention includes risk mitigation tracking capabilities. This feature allows organizations to track and manage the methods used to address identified risks. The system supports four primary risk mitigation methods:

Accept: The organization acknowledges the risk and chooses to take no action.

Transfer: The risk is transferred to a third party.

Mitigate: Actions are taken to reduce the likelihood or potential impact of the risk.

Avoid: The organization eliminates the ability for the risk to even be an option.

When an Issue is identified by the system in an embodiment, a user interface is configured to provide the user with the ability to assign one of these risk mitigation methods to the Issue. This assignment helps organizations track their risk management strategies and ensure appropriate actions are taken to address potential security and compliance concerns.

The risk mitigation tracking feature in an embodiment integrates with the Issue management capabilities of the system, allowing organizations to maintain a clear record of how they are addressing identified risks within their Workday ERP environment.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

The invention claimed is:

1. A system for monitoring and managing security in an Enterprise Resource Planning (ERP) environment, the system comprising:

one or more processors and one or more non-transitory computer-readable storage media storing instructions that, when executed by the one or more processors, implement:

continuous active monitoring operations executing on the one or more processors comprising:

performing automated scans of one or more ERP environments at predetermined intervals of no more than 24 hours by executing REST API calls over a network interface to extract audit log data and configuration information and storing the extracted data in a configuration baseline repository;

identifying control conflicts within predefined control categories by analyzing the extracted ERP data against configurable rulesets stored in the one or more non-transitory computer-readable storage media;

automatically generating issues corresponding to identified control conflicts with priority assignments based on severity and compliance framework requirements and storing the generated issues in an issue management database;

automatically reopening previously closed issues retrieved from the issue management database when detecting changes in business process definitions by comparing a current configuration snapshot to a previously stored configuration baseline that reintroduce previously remediated control conflicts;

periodic assessment operations executing on the one or more processors comprising:

maintaining a centralized repository stored in the one or more non-transitory computer-readable storage media for tracking and executing periodic audit activities with definable cadence parameters;

providing customizable review activities with configurable duration, owner, and approver parameters;

generating calendar views on a display interface displaying upcoming audit activities across multiple compliance frameworks;

establishing linkages stored in a control mapping database between periodic assessment controls and continuous active monitoring controls to provide unified compliance reporting;

multi-environment operations executing on the one or more processors comprising:

simultaneously connecting to and monitoring multiple ERP environments via separate API endpoints and authentication credentials including production and non-production instances;

enabling environment-specific control scanning customization through independently configurable rulesets stored per environment in the one or more non-transitory computer-readable storage media;

aggregating monitoring results across environments into a data aggregation layer for centralized review;

segregation of duties (SOD) monitoring operations executing on the one or more processors comprising:

analyzing user access permissions aggregated from role assignments, security groups, and business process security configurations against configurable SOD rulesets defining incompatible function combinations;

identifying SOD conflicts based on business process definition analysis;

monitoring changes to business process definitions by maintaining and comparing successive configuration snapshots stored in the one or more non-transitory computer-readable storage media and automatically reopening SOD issues when configuration changes reintroduce previously remediated conflicts;

wherein the system specifically monitors compliance with SOC1, SOC2, and GDPR requirements through framework-specific control mappings stored in the one or more non-transitory computer-readable storage media and applied by the one or more processors to filter monitoring results.

2. The system of claim 1, wherein the continuous active monitoring operations performs automated scans on a 24-hour cycle.

3. The system of claim 1, wherein the REST API calls extract custom report data built within the ERP environment using native reporting tools.

4. The system of claim 1, wherein the segregation of duties monitoring operations identifies changes to business process definitions by comparing, via the one or more processors, current configuration snapshots generated at each scan interval and stored in the configuration baseline repository to previously stored configuration baselines also stored in the configuration baseline repository, wherein the configuration baseline repository is maintained in the one or more non-transitory computer-readable storage media.

5. The system of claim 1, wherein the one or more processors further implement machine learning operations configured to train, using a training process executed on the one or more processors, on historical user access data stored in the non-transitory computer-readable storage media, identify anomalous user behavior patterns by analyzing historical access patterns to generate a baseline behavior model stored in the non-transitory computer-readable storage media, and flag, by the one or more processors, deviations exceeding predefined threshold values by scoring current user activity against the stored baseline behavior model.

6. The system of claim 1, wherein the configurable rulesets for segregation of duties analysis define incompatible function combinations based on industry-specific compliance requirements.

7. The system of claim 1, wherein the periodic assessment operations track remediation timelines and generate alerts when remediation activities exceed predefined duration thresholds.

8. The system of claim 1, wherein the multi-environment support operations enable independent control scanning schedules for production and non-production environments.

9. The system of claim 1, further comprising sensitive and privileged access monitoring operations configured to:

define sensitive access categories based on data classification levels;

define privileged access categories based on administrative function access; and monitor for unauthorized privilege escalations by detecting changes in user role assignments.

10. The system of claim 1, wherein the framework-specific control mappings enable simultaneous compliance reporting across multiple frameworks from a single set of monitoring activities.

11. The system of claim 1, wherein the automatically reopened issues include references to the specific business process definition changes that caused the issue reopening.

12. A method for monitoring and managing security in an Enterprise Resource Planning (ERP) environment, the method being performed by one or more processors executing instructions stored on one or more non-transitory computer-readable storage media and comprising:

configuring a continuous active monitoring operation on the one or more processors to scan one or more ERP environments at intervals of no more than 24 hours;

executing by the one or more processors REST API calls over a network interface to the one or more ERP environments to extract audit log data, user access permissions, and business process configuration information and storing the extracted information as a configuration snapshot in a non-transitory storage media;

analyzing by the one or more processors the extracted data against configurable rulesets stored in the non-transitory storage media defining control conflicts across multiple control categories including segregation of duties, sensitive access, and privileged access;

automatically generating by the one or more processors issues for identified control conflicts and storing the issues in an issue management database, each issue comprising:

a description of the control conflict;

a priority assignment based on severity and compliance framework requirements;

assignment to a responsible remediation owner;

monitoring by the one or more processors for changes in business process definitions within the ERP environment by comparing a current configuration snapshot to a previously stored configuration baseline stored in the non-transitory storage media;

automatically reopening by the one or more processors previously closed issues retrieved from the issue management database when detected changes in business process definitions identified through the snapshot comparison reintroduce previously remediated control conflicts;

maintaining in the non-transitory storage media a centralized repository of periodic assessment controls with configurable cadence, duration, owner, and approver parameters;

linking periodic assessment controls to continuous active monitoring controls via a control mapping database stored in the non-transitory storage media to provide unified compliance tracking;

simultaneously monitoring by the one or more processors via separate API endpoints and authentication credentials multiple ERP environments including production and non-production instances with environment-specific control scanning configurations;

generating compliance reports by filtering monitoring results stored in the non-transitory storage media mapped to specific compliance frameworks including SOC1, SOC2, and GDPR.

13. The method of claim 12, wherein the 24-hour scanning interval is configurable based on environment type, with production environments scanned more frequently than non-production environments.

14. The method of claim 12, wherein automatically reopening previously closed issues further comprises:

identifying all users whose access permissions are affected by a detected change in business process definitions;

for each affected user, querying a per-user issue history stored in the issue management database to determine whether the affected user had previously resolved issues marked as remediated through mitigating controls, exception approval, or user role change;

determining whether the detected change grants the affected user permissions that reintroduce a previously resolved control conflict; and responsive to determining that a previously resolved control conflict is reintroduced, reopening the associated issue, reassigning the reopened issue to a responsible remediation owner, and appending to the reopened issue information identifying the specific business process definition change that caused the reopening.

15. The method of claim 12, further comprising training a baseline behavior model on historical user activity data extracted from the audit log data using at least one of an isolation forest algorithm, a one-class support vector machine, or a neural network autoencoder;

scoring current user activities against the baseline behavior model; and generating an alert when a deviation from the baseline behavior model exceeds a configurable threshold value.

16. The method of claim 12, wherein the REST API calls are executed using service accounts with read-only access permissions to the ERP environment.

17. The method of claim 12, further comprising generating calendar views displaying upcoming periodic assessment activities with visual indicators for activity status including not started, in progress, and completed.

18. The method of claim 12, wherein linking periodic assessment controls to continuous active monitoring controls comprises establishing mappings between control identifiers across both control types.

19. The method of claim 12, further comprising tracking remediation timelines for generated issues and calculating average remediation duration metrics across control categories.

20. The method of claim 12, wherein compliance reports generated for a selected compliance framework comprise control descriptions, testing procedures, test results, identified exceptions, and remediation status for each identified exception, formatted according to the selected compliance framework.

* * * * *